US012223862B2

(12) United States Patent
Van Wiemeersch et al.

(10) Patent No.: US 12,223,862 B2
(45) Date of Patent: Feb. 11, 2025

(54) PHOTOMETRIC PROJECTION COMPENSATION FOR TRANSPARENT HEAD UP DISPLAY (HUD)

(71) Applicant: Ford Global Technologies, LLC, Dearborn, MI (US)

(72) Inventors: John Robert Van Wiemeersch, Novi, MI (US); Jaewon Yoon, Novi, MI (US); Ryan Joseph Gorski, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/326,212

(22) Filed: May 31, 2023

(65) Prior Publication Data

US 2024/0404435 A1 Dec. 5, 2024

(51) Int. Cl.
*G02B 27/01* (2006.01)
*G06F 3/04842* (2022.01)
(Continued)

(52) U.S. Cl.
CPC ......... *G09G 3/002* (2013.01); *G02B 27/0101* (2013.01); *G06F 3/04842* (2013.01);
(Continued)

(58) Field of Classification Search
CPC ............... G09G 3/002; G09G 2380/10; G02B 27/0101; G02B 2027/014;
(Continued)

(56) References Cited

U.S. PATENT DOCUMENTS 8,817,090 B2   8/2014  Szczerba et al.
11,482,141 B1  10/2022 Wells et al.
(Continued)

FOREIGN PATENT DOCUMENTS

CN   112991229 A    6/2021
WO   2020260854 A1  12/2020

OTHER PUBLICATIONS

"ADAS Sensor Calibration Increases Repair Costs," AAA Automotive, Jan. 31, 2023, 18 pages.
(Continued)

*Primary Examiner* — Dennis P Joseph
(74) *Attorney, Agent, or Firm* — Frank Lollo; Brooks Kushman P.C.

(57) ABSTRACT

A damaged portion of a vehicle windshield in an area near a transparent display (TD) of a head up display (HUD) may be treated with a resin. The treated portion may introduce brightness artifacts into an image projected onto the TD. To compensate images projected onto the TD for the brightness artifacts, first pixel intensity adjustment values are received via a touchscreen. Pixels of a reference image are adjusted in accordance with the first pixel intensity adjustment values to provide a reference compensated image which, when projected by a projector of the head up display (HUD) system onto the TD, counters effects of spatially varying reflectance properties of treated portion of the windshield which would otherwise appear were the reference image displayed on the TD without compensation.

20 Claims, 8 Drawing Sheets

(51) Int. Cl.
*G06F 3/04845* (2022.01)
*G06F 3/04847* (2022.01)
*G06F 3/0488* (2022.01)
*G09G 3/00* (2006.01)
*B60K 35/00* (2006.01)
*B60K 35/23* (2024.01)
*G06F 3/041* (2006.01)

(52) U.S. Cl.
CPC ...... *G06F 3/04845* (2013.01); *G06F 3/04847* (2013.01); *G06F 3/0488* (2013.01); *B60K 35/00* (2013.01); *B60K 35/23* (2024.01); *G02B 2027/0118* (2013.01); *G02B 2027/014* (2013.01); *G02B 2027/0141* (2013.01); *G06F 3/0412* (2013.01); *G09G 2354/00* (2013.01); *G09G 2360/16* (2013.01); *G09G 2380/10* (2013.01)

(58) Field of Classification Search
CPC ......... G02B 2027/0141; G06F 3/04842; G06F 3/0488; G06F 3/0412; B60K 35/23; B60K 35/231
See application file for complete search history.

(56) References Cited

U.S. PATENT DOCUMENTS

| | | | |
|---|---|---|---|
| 2020/0096776 A1* | 3/2020 | Hayashi | G09G 5/003 |
| 2021/0157135 A1* | 5/2021 | Wells | B60K 35/00 |
| 2023/0033372 A1* | 2/2023 | Hwang | H04N 13/111 |
| 2023/0162243 A1* | 5/2023 | Southin | G06Q 30/06 705/306 |
| 2024/0160018 A1* | 5/2024 | Degen | G02B 27/0172 |

OTHER PUBLICATIONS

"Piccolo Software Programmer's Guide for the DLPC120 ASIC," Texas Instruments—User Guide, Mar. 2018, 122 pages.

"DLP® LightCrafter™ DM365 Command Interface Guide," Texas Instruments, Jan. 2012, 16 pages.

Nayar, S. K., "A Projection System with Radiometric Compensation for Screen Imperfections," Computer Vision Laboratory, Department of Computer Science, Columbia University, Dec. 2010, 8 pages.

* cited by examiner

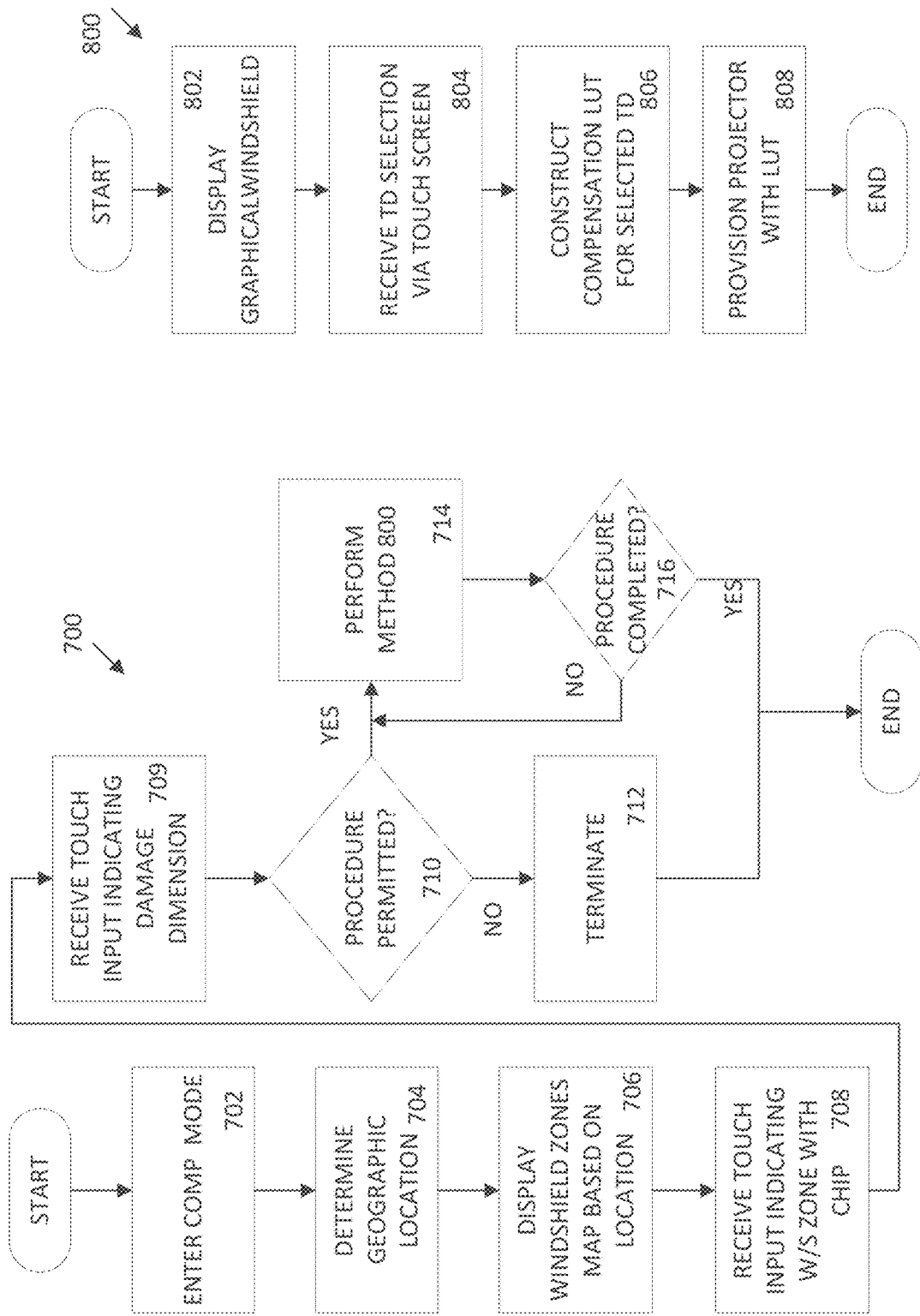

PHOTOMETRIC PROJECTION COMPENSATION FOR TRANSPARENT HEAD UP DISPLAY (HUD)

BACKGROUND

A vehicle head up display (HUD) may comprise a transparent display (TD) including a transparent film upon which a holographic optical element (HOE) is recorded. The transparent film is disposed in a portion of a vehicle windshield. The windshield surface overlays and underlays the TD. Optical images are projected through the windshield surface onto the TD by a HUD projector. A chip or pit in the windshield surface can cause spatial variations in the surface albedo of the windshield. Surface albedo is defined as the ratio of radiant flux leaving a surface to the radiant flux received by the surface. The spatial variations in windshield surface albedo proximal the TD can cause brightness aberrations in portions of optical images being displayed on the TD. In some cases, a windshield with a chip or pit must be replaced and the problem is solved. In other cases, the area of the windshield with the chip or pit may be treated with an epoxy resin to prevent further damage. However, the resin treatment itself can introduce variations in surface albedo of the windshield in the area of the TD, resulting in brightness aberrations in the displayed optical images.

BRIEF DESCRIPTION OF THE DRAWINGS

FIG. 7 is a flowchart of a method for screening vehicles for eligibility for windshield repair;

FIG. 8 is a flowchart of a method for photometric projection compensation; and

DESCRIPTION

A chip in a portion of a vehicle windshield providing a transparent display (TD) may be treated with a resin. The treated portion may cause spatial variations in the surface albedo of the windshield in which the TD is disposed, thereby causing brightness artifacts in images displayed on the TD. Projector photometric compensation aims to modify projector input images to compensate them for disturbances introduced by spatially varying albedo of a display surface. The disclosure provides apparatus and methods for photometric compensation of a TD for variations in surface albedo.

Figure 1:
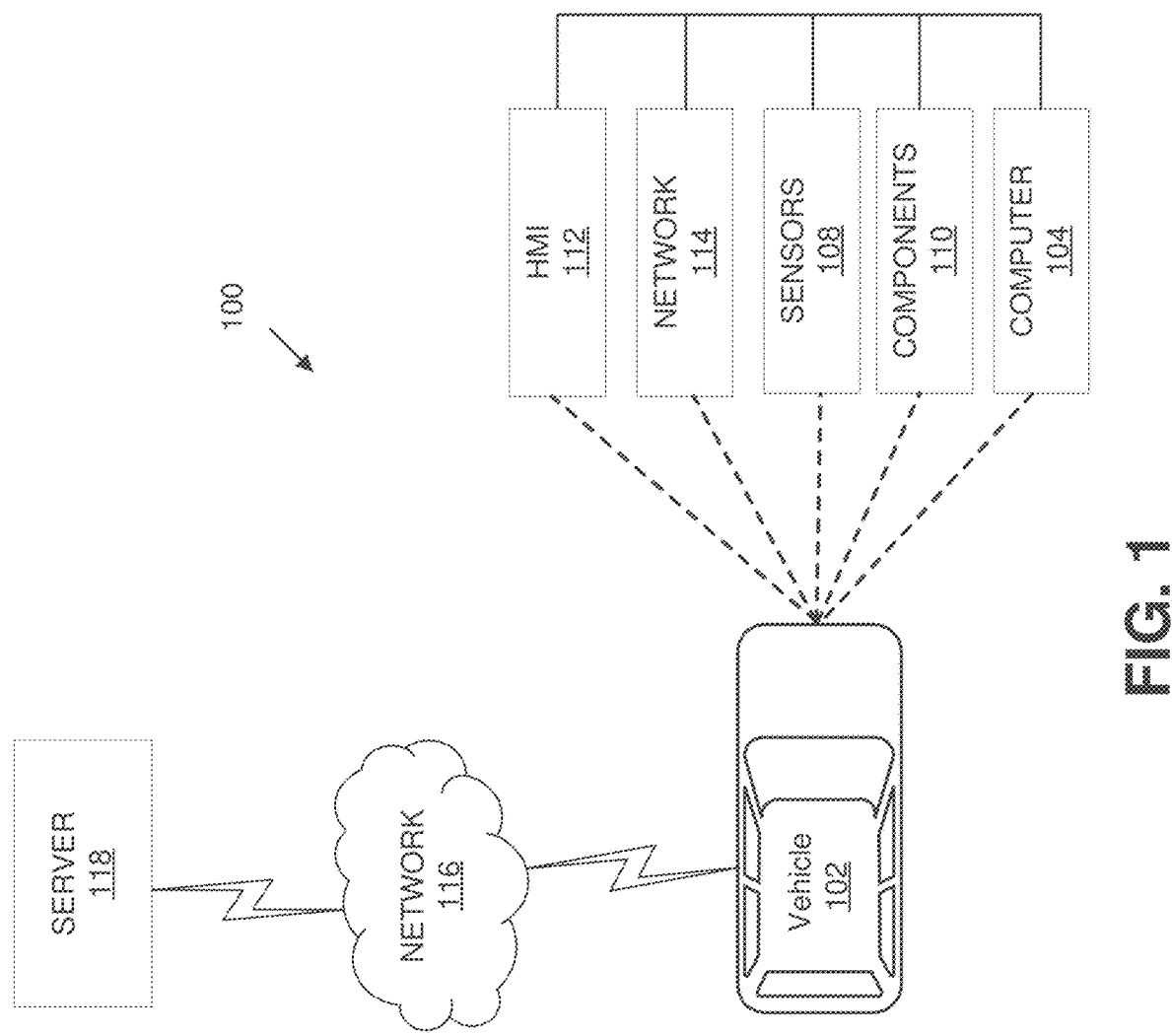
FIG. 1 is a block diagram of an exemplary vehicle system.

FIG. 1 is a block diagram of an example vehicle 102 including a vehicle system 100 suitable for implementing the apparatus and methods disclosed herein. Vehicle system 100 can include sensors 108 including one or more imaging sensors and one or more ranging sensors. Vehicle 102 includes a vehicle computer 104, which may include one or more electronic control units (ECU) disposed within vehicle 102 to control operation of various devices and components 110 of vehicle 102. Computer 104 can be generally programmed to send and/or receive, messages via vehicle network 114 to communicate with other devices disposed within the vehicle e.g., sensors 108, actuators, components 110, communications modules, a human machine interface (HMI) 112, etc.

Vehicle system 100 can include one or more vehicle networks 114 over which the various electronic control units (ECU), including computer 104 can intercommunicate to send commands and/or exchange, send or receive data. A vehicle network 114 could include but is not limited to one or more of a controller area network (CAN), local interconnect network (LIN), Ethernet, Wi-Fi®, and/other wired or wireless communication networks. In some implementations vehicle computer 104 and/or other components of vehicle system 100 may be configured to communicate with a remote server 118 via a wide area network (WAN) 116.

A computing device 104 includes a processor and a memory such as are known. Further, the memory includes one or more forms of computer-readable media, and stores instructions executable by the processor for performing various operations, including as disclosed herein. For example, the computing device 104 may include programming to operate one or more of vehicle brakes, propulsion (i.e., control of acceleration in the vehicle 102 by controlling one or more of an internal combustion engine, electric motor, hybrid engine, etc.), steering, climate control, interior and/or exterior lights, etc., as well as to determine whether and when the computing device 104, as opposed to a human operator, is to control such operations.

The computing device 104 may include or be communicatively coupled to, i.e., via a vehicle communications bus as described further below, more than one computing devices, i.e., controllers or the like included in the vehicle 102 for monitoring and/or controlling various vehicle components, i.e., propulsion, braking, steering, etc. The computing device 104 is generally arranged for communications on a vehicle communication network 114, i.e., including a bus in the vehicle 102 such as a controller area network (CAN) or the like; the vehicle 102 network 114 can additionally or alternatively include wired or wireless communication mechanisms such as are known, i.e., Ethernet or other communication protocols.

Via the vehicle network 114, the computing device 104 may transmit messages to various devices in the vehicle and/or receive messages from the various devices, i.e., controllers, actuators, sensors, etc., including sensors 108. Alternatively, or additionally, in cases where the computing device 104 actually comprises multiple devices, the vehicle communication network 114 may be used for communications between devices represented as the computing device 104 in this disclosure. Further, as mentioned below, various controllers or sensing elements such as sensors 108 may provide data to the computing device 104 via the vehicle communication network 114.

In addition, the computing device 104 may be configured for communicating through a vehicle-to-infrastructure (V2X) interface with a remote server computer 118, i.e., a cloud server, via a network 116, which, as described below, includes hardware, firmware, and software that permits computing device 104 to communicate with a remote server computer 118 via a network 116 such as wireless Internet (WI-FI®) or cellular networks. A V2X interface may accordingly include processors, memory, transceivers, etc., configured to utilize various wired and/or wireless networking technologies, i.e., cellular, Bluetooth®, Bluetooth® Low Energy (BLE), Ultra-Wideband (UWB), Peer-to-Peer communication, UWB based Radar, IEEE 802.11, and/or other wired and/or wireless packet networks or technologies. Computing device 104 may be configured for communicating with other vehicles 102 through V2X (vehicle-to-everything) interface using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 102 or formed through infrastructure-based networks. The computing device 104 also includes nonvolatile memory such as is known. Computing device 104 can log data by storing the data in nonvolatile memory for later retrieval and transmittal via the vehicle communication network 114 and a vehicle to infrastructure (V2X) interface to a server computer 118 or a user mobile device.

As already mentioned, generally included in instructions stored in the memory and executable by the processor of the computing device 104 is programming for operating one or more vehicle 102 components, i.e., braking, steering, propulsion, etc., without intervention of a human operator. Using data received in the computing device 104, i.e., the sensor data from the sensors 108, the server computer 118, etc., the computing device 104 may make various determinations and/or control various vehicle 102 components and/or operations. For example, the computing device 104 may include programming to regulate vehicle 102 operational behaviors (i.e., physical manifestations of vehicle 102 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Sensors 108 may include a variety of imaging devices such as cameras and/or other devices known to provide data via the vehicle communications bus. For example, a radar fixed to a front bumper (not shown) of the vehicle 102 may provide a distance from the vehicle 102 to a next vehicle in front of the vehicle 102, or a global positioning system (GPS) sensor disposed in the vehicle 102 may provide geographical coordinates of the vehicle 102.

Figure 2:
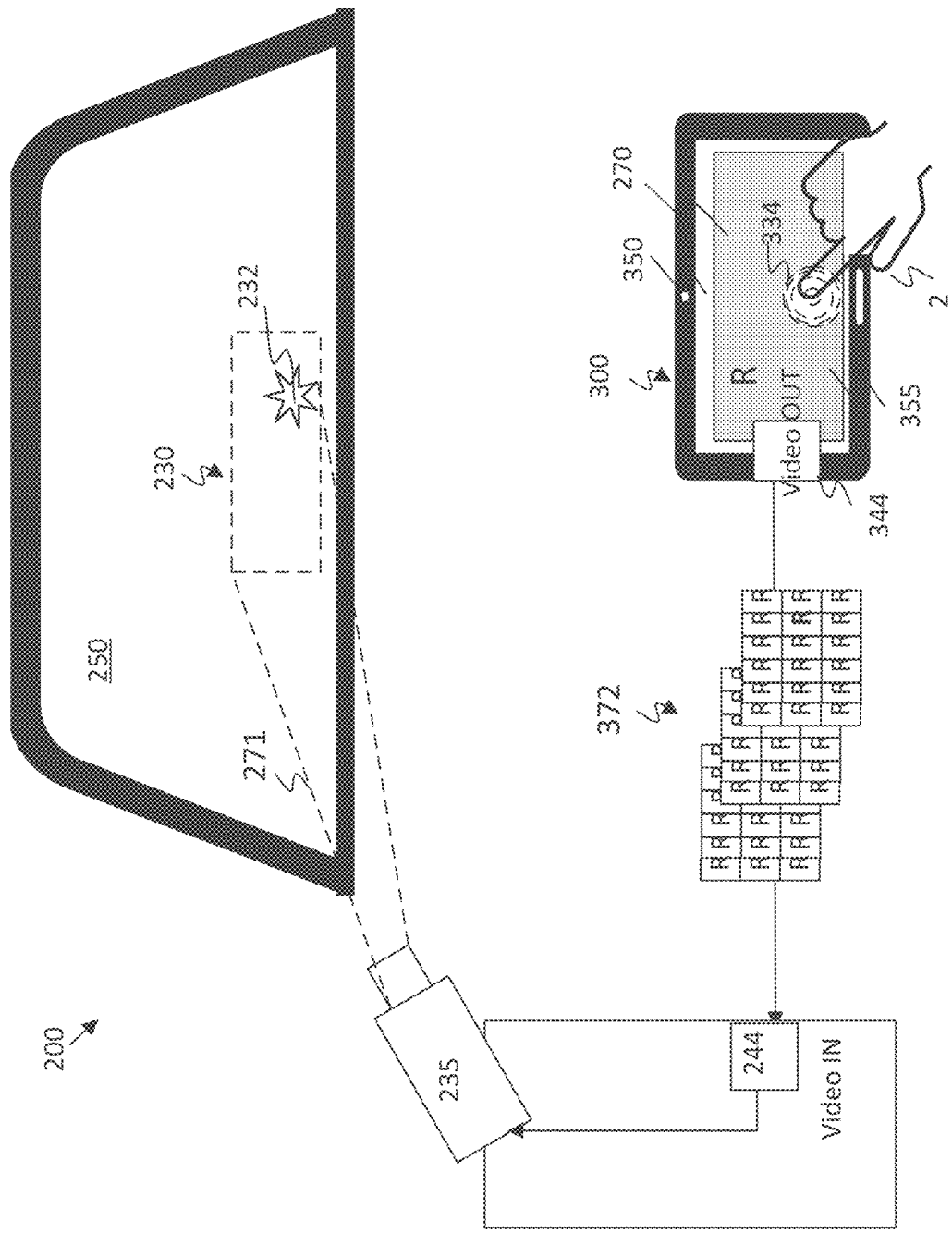
FIG. 2 is a block diagram of an apparatus for photometric projection compensation.

FIG. 2 is a block diagram of an apparatus 300 for photometric projection compensation of a transparent display (TD) 230 for variations in surface albedo due to a chip, pit 232, and/or epoxy filler in a vehicle windshield 250. In the example of FIG. 2 a HUD system 200 includes one or more transparent displays such as TD 230. TD 230 comprises a holographic film on which a hologram of a hologram of an optical element is recorded as an interference pattern. The film bearing the hologram implements a holographic optical element (HOE) (not visible in FIG. 2). The film is disposed in a portion of windshield 250 (or other glazing of a vehicle) between an outer and inner surface of the glazing. In the example implementations disclosed herein, TD 230 is a reflection hologram. A reflection hologram is manufactured by recording light waves arriving at opposite sides of the recording medium to create the interference pattern. In the example, the HOE recording is 'played back' by projecting optical image light onto the film. The interference pattern responds to the projected image light in accordance with the optical transfer function of the optical element whose hologram produced it. A reflection HOE implementing a diffraction optical element (DOE) diffracts selected incident light back through the medium through which it arrived to form an image in a viewing area or 'eyebox'.

In essence TD 230 is a diffraction grating disposed in glass serving as a projection surface or 'screen'. Thus, TD 230 has wavelength and angular selectivity and has a diffraction efficiency that varies as a function of angle of incidence. For TDs without surface defects about 60% of the light projected onto the TD passes through the 'screen', i.e. through the HOE and the windshield glass. This allows a vehicle occupant to 'see through' the HOE to perceive the driving environment outside the vehicle.

A chip or pit in the windshield glass changes the surface albedo in the area of the chip. The chip or pit may be repaired by treating the glazing, e.g., with an epoxy resin. However, the epoxy resin treatment also causes variations in the surface albedo. The effects may not be noticeable under typical ambient lighting conditions. However, when light beams project onto the TD from a DLP projector, it can manifest noticeable aberrations in brightness and color in areas of optical images displayed on the TD in the treated areas.

Photometric projection compensation is a technique for neutralizing the effects of variations in projection screen surface albedo on displayed images by compensating projected image pixel intensities in areas of the screen manifesting the aberrations. The compensation values for the projected images are typically calculated using a projector-camera system with the camera serving as a proxy for a human observer. The camera senses and measures the reflectance properties for each pixel of an image displayed on the screen surface. A series of transforms determine pixel intensities which, when converted to an optical image by a projector and projected onto the screen surface, would modulate to intensities that would be expected if the display surface had uniform albedo.

Camera based techniques are not always a practical solution for photometric projection compensation of vehicle HUD projectors. Vehicle cabin size and space constraints, off-axis projection arrangements and viewing area (eyebox area) constraints can make reliable camera measurements challenging.

Accordingly, the disclosure provides a photometric compensation apparatus 300 that can be used without a camera to compensate a projected optical image for effects of variations in surface albedo of a windshield surface. In the examples described herein a projection surface comprises a TD 230 of a HUD system 200, including an HOE. The TD is disposed within the windshield.

It will be appreciated; the disclosure is not limited to TDs disposed in vehicle windshields or within glass surfaces. The disclosure encompasses other vehicle glazing such as windows, including vista glass roofs and rear windows in which a TD may be disposed. Those of ordinary skill upon reading this disclosure will appreciate a wide range of practical applications for the disclosed apparatus and methods. Any glazing having spatially varying surface albedo that would introduce observable brightness aberrations in displayed images may benefit from photometric projection compensation disclosed herein.

Apparatus 300 enables a user 2, who is a human observer, to interact with a HUD projector, e.g., projector 235, via a touchscreen 355 to empirically establish pixel intensity compensation values using the human eye as a light sensor instead of a camera. User 2 manipulates touchscreen 355 by touching an area, e.g., 334 to adjust intensity of light projected by projector 235 onto TD 230 in a corresponding area of a pit or chip 232 of windshield 250, which user 2 observes to exhibit brightness aberrations.

In the example of FIG. 2 apparatus 300 includes a video image output port 344. A processor 310 of apparatus 300 is configured to establish a communication link via video output port 344 with projector 235 via a corresponding projector communication port 244. Processor 310 may be implemented as a single processor structure or as a plurality of processor structures. Apparatus 300 sends frames 372 of digital images to projector 235 via video output port 344. The digital image frames are generated by user 2 interacting with touchscreen 355. Projector 235 receives frames 372, converts the digital images to optical images, and projects the optical images onto TD 230. TD 230 displays the optical images. User 2 can directly observe TD 230 to perceive the effects of spatially varying surface albedo on the displayed optical images.

Figure 3:
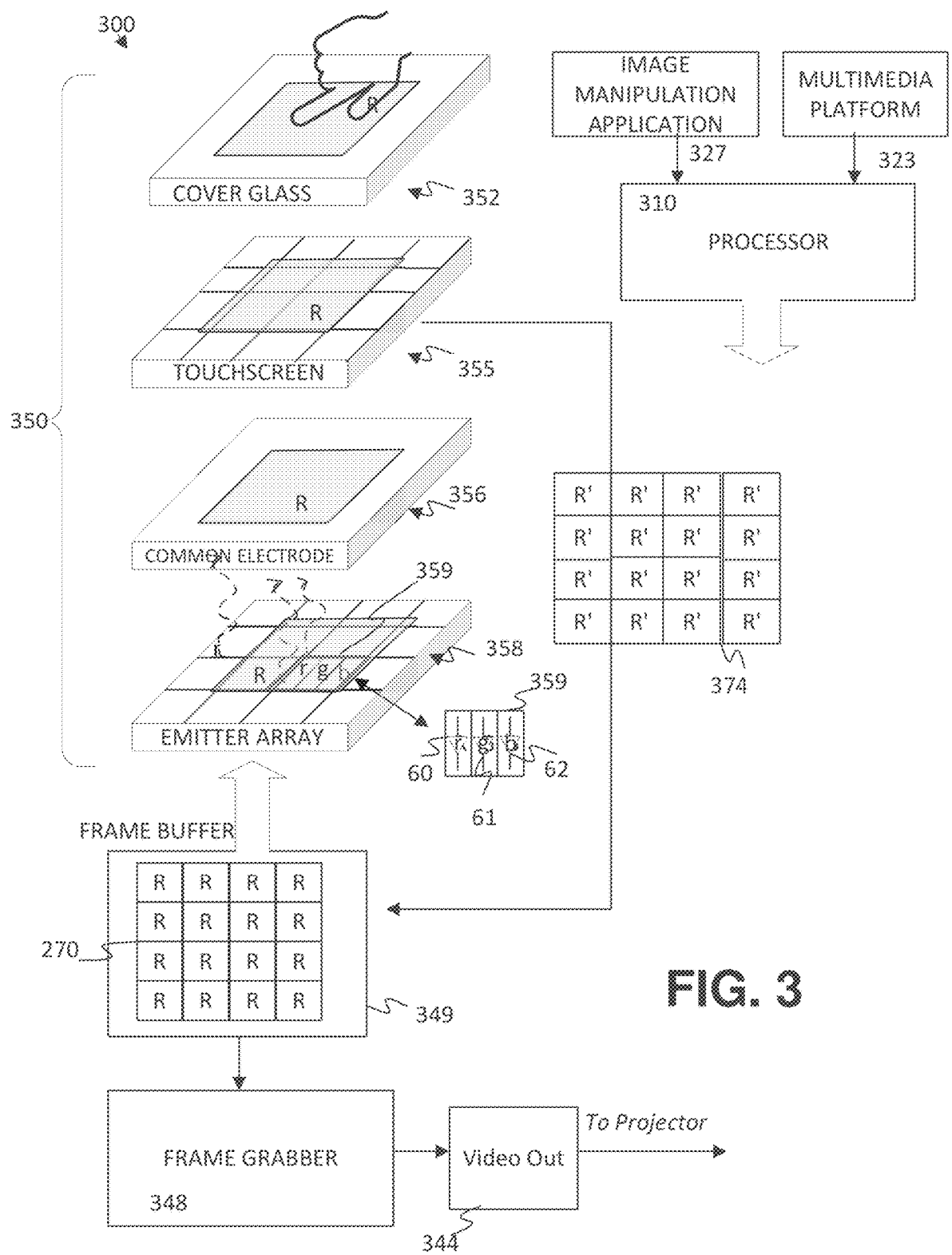
FIG. 3 is an exploded view of a display panel of the apparatus shown in FIG. 2.

FIG. 3 is a block diagram of apparatus 300 including an exploded view of display panel 350. Display panel 350 comprises an emitter array 358, a common electrode layer 356, a touchscreen layer 355 and a transparent cover layer 352. In the example of FIG. 3, emitter array 358 is an array of light emitting elements 359 (also referred to as display pixels 359). Each display pixel 359 comprises a red subpixel (red light emitter 60), a green subpixel (green light emitter 61) and a blue sub-pixel (blue light emitter 62). In the example of FIG. 3 red, green, and blue light emitters 60, 61, 62 are light emitting diodes (LEDs). Thus, each display pixel of emitter array 358 comprises at least one red LED 60, at least one green LED 61 and at least one blue LED 62. The disclosure is not limited by the particular display technology shown in the example of FIG. 3. Those of ordinary skill will appreciate a wide range of display technologies will be suitable for implementing display panel 350, emitter array 358 and pixels 359.

Apparatus 300 can further include a frame buffer 349 and a frame grabber 348. Frame buffer 349 consists of a portion of random-access memory (RAM) comprising memory 320 configured to buffer, or temporarily stores a digital image, e.g., reference image 270 to be displayed on display panel 350. Frame buffer 349 is configured to drive pixels 359 of emitter array 358 with pixel intensity values specified by the digital image stored in frame buffer 349. As the LEDs comprising the pixels illuminate, an optical image is formed on display panel 350.

In the example of FIG. 3 reference image 270 is a red channel image. Accordingly, reference image 270 comprises an array of intensity values for driving red subpixels of emitter array 358. In the methods disclosed herein, reference images and reference compensated images can include red channel images, green channel images, blue channel images, and/or RGB images comprising all three color channel images. In the example reference images described herein, the reference intensity values of subpixels in a subpixel array are the same, e.g., 128.

When the intensity values of the reference image are adjusted (e.g., from the reference value of 128) by user interaction with touchscreen 355, the result is a compensated reference image, i.e., the intensity adjustments to the reference image compensate the reference image for brightness aberrations that would otherwise be caused by the chip or repair if the reference image were projected without compensation. The compensated reference image may be produced by one or more 'rounds' of user adjustments that produce a modified reference compensated image. For example, the reference image may be displayed on display panel 350 of apparatus 300 and compensated in a first round of user manipulation of pixel intensity values via touchscreen 355. This first round may produce an intermediate compensated reference image, i.e., a modified compensated reference image. For example, the user can make further adjustments in another round in which the intermediate compensated reference replaces the reference image on display panel 350, while at the same time being sent to projector 235 for projection onto TD 230 of HUD system 200 (as described below). The displayed intermediate compensated image may be observed by the user as the user manipulates touchscreen 355 to make further adjustments.

After the user makes the last user adjustment, processor 310 is configured to map pixel values of the compensated reference image to pixel values of the reference image. The mapping can be encoded in a look up table (LUT) and stored in the projector. Thereafter, when a HUD digital image is received by the projector, it may use the LUT to adjust pixels of the HUD digital image in accordance with the same mapping applied to the reference image to produce a compensated HUD image. The compensated HUD image can then be projected by a projector of a head up display (HUD) system onto the transparent display through the chipped or repaired vehicle windshield surface. The intensity-adjusted light comprising the compensated HUD optical image counters the brightness aberration effects that would otherwise be introduced in the HUD optical image displayed on the TD without compensation in the area of chip or repair 334.

As the user manipulates touchscreen 355, frame grabber 348 captures (i.e., "grabs") frames (images) from frame buffer 349 and sends the frames to projector 235 via a video output port 344. Frame grabber 348 allows images displayed on display panel 350 to be simultaneously projected onto any one or more of TDs 220, 230 240 of HUD system 200 (best illustrated in FIG. 4).

Processor 310 can be configured by a graphical image manipulation program 327 to generate, modify and otherwise manipulate the reference images and reference compensated images described herein. Processor 310 may be configured by a multimedia platform 323 to implement frame grabber 348 and to perform decoding, encoding, transcoding, multiplexing, demultiplexing, streaming and filtering of any type of images including graphical images described herein, in any format.

In the examples described herein images are described in terms of an 'RGB' (red, green blue) color model. An RGB image comprises three image channels: red, green, and blue. A red image channel comprises a frame of intensity values for red subpixels of an RGB image, where red 'subpixels' of an RGB image correspond to an array of red light emitters (example illustrated at 60) of the display device, and/or an array of red light sensors of an imaging device such as a camera (not used in the illustrated examples). Likewise, a green image channel comprises a frame of intensity values for green subpixels (61), and so on for a blue image channel. However, the disclosure is not limited in application to RGB images. Other suitable color models include YUV wherein Y specifies luminance, U specifies blue chrominance and V specifies red chrominance; CMYK (cyan, magenta, yellow and key (black)); and HSV (hue saturation value).

In the example implementations described herein RGB images are 24-bit images, each channel providing 8 bits to represent light intensity levels between 0 and 255 for each subpixel. In some implementations the RGB image can be 48-bit, wherein each channel has 16-bits to represent intensity levels for a pixel color.

A red channel image comprises an array in which red subpixel intensity values of an RGB image maintain their values in the RGB image, i.e., values range between 0 and 255. Green and blue subpixel intensity values of the RGB image are set to 0. A green channel image comprises an array in which green subpixel intensity values of the RGB image maintain their values in the RGB image, i.e., values range between 0 and 255. Red and blue subpixel intensity values are set to 0. A blue channel image comprises an array in which blue subpixel intensity values are maintained in the RGB image, i.e., values range between 0 and 255. Red and green subpixel intensity values are set to 0. In other words, to display a color representation of a given color channel of an RGB image, the given color channel maintains its original pixel intensity values and pixel intensity values in the other two color channels are set to 0.

In this specification a 'digital image' refers to digital values while the term 'optical image' refers to light. The digital values specify relative intensities of light that will be emitted when the values are applied to drive light emitters. The relative values specify mixtures of red, green and blue light defining color and brightness of each pixel.

A displayed image is an optical image comprising image modulated light propagating away from a display screen. A projected image is an optical image comprising light propagating from a projector toward a display screen. A display screen is any surface illuminated by light from a projector for the purpose of displaying optical images thereon.

A red, green and blue (RGB) color image comprises a red image subchannel which consists of an array of red light intensity values for the red subpixels comprising the red subarray of emitter array 358, a green image subchannel consisting of an array of green light intensity values for the green subarray of emitter array 358, and a blue image subchannel consisting of an array of blue light intensity values for the blue subarray of emitter array 358. In combination, the red, green and blue subchannel intensity values specify mixtures of red, green and blue light for display pixels 359 of emitter array 358.

FIG. 3 shows an example red channel reference digital image 270 loaded into frame buffer 349 for display as an optical image on display panel 350. User 2 adjusts the red subpixel intensity values by manipulating touch sensitive elements, e.g., 354 of touchscreen 355. Processor 310 is configured by graphical image manipulation application 327 to interpret the sensed touch as adjustments to pixel intensity values of a displayed image in an area corresponding to the area of the touch so that user manipulation of touchscreen 355 produces an array of pixel intensity adjustment values 374.

Processor 310 is configured by graphical image manipulation application 327 to provide a color channel projection reference compensated image by adjusting the subpixel intensity values of reference image 270 in frame buffer 349 by amounts given by the intensity adjustment values of intensity adjustment array 374, e.g., increasing or decreasing the subpixel intensity values from their reference values of 128 in accordance with the user's touch sensed by touchscreen 355. The value 128 is half the maximum intensity value of 256 in implementations in which 8 binary digits (bits) are used to represent pixel intensity values. Processor 310 is configured to provide reference compensated images for red, green and blue image channels.

Processor 310 loads each successive, respective reference compensated image for the red, green and blue image channels into frame buffer 349 where it is displayed on display panel 350, and also grabbed by frame grabber 348. Processor 310 is configured by multimedia platform 323 to format the reference compensated image comprising the grabbed frame for compatibility with projector 235 and to send the properly formatted reference compensated image to projector 235 for projection onto transparent display 230. Thus, apparatus 300 enables user 2 to observe the reference compensated image displayed on transparent display 230 at the same time user 2 manipulates the reference compensated image displayed on display panel 350 of apparatus 300.

In such implementations frame grabber 348 may be configured to convert frames grabbed from frame buffer 349 to a format compatible with projector 235 based, e.g., on a device profile 375 for projector 235, which is stored in memory 320 of apparatus 300. Device profile 375 may provide geometric mapping between pixels of display panel 350 and pixels of projector 235.

Projector 235 converts the received arrays to optical images 271 in accordance with the pixel intensity values, and projects optical images 271 onto TD 230. TD 230 displays the optical images by diffracting the optical image light to an eyebox area where the displayed optical images can be observed by user 2. User 2 can use apparatus 300 to adjust pixel intensity values based on the observed brightness aberrations in the optical images displayed on transparent display 230.

In that manner, apparatus 300 enables user 2 to define photometric projection compensation for any image to be displayed on TD 230. When the compensated projected optical images are displayed on TD 230 the projected optical image light will modulate to increase brightness uniformity of the displayed optical image on TD 230.

Apparatus 300 maps pixel values comprising a reference array 270 to pixel values comprising a compensation array thereby providing pixel maps. Processor 310 constructs one or more lookup tables (LUTs) based on the pixel value mappings. Apparatus 300 provisions projector 235 with the one or more LUTs. Projector 235 stores the one or more LUTs. Subsequently, in routine operation of the vehicle, any images to be projected onto TD 230 can be provided to the LUT. The LUT adjusts the red image pixels, the blue image pixels and the green image pixels in accordance with the mappings stored in the one or more LUTs, thereby providing photometric projection compensation to the images to be projected onto a TD. When TD 230 displays the compensated optical images, the compensated optical images have an increased brightness and color uniformity in the area of the chip or epoxy resin treatment 232 as compared to their uncompensated counterpart reference images.

Figure 4:
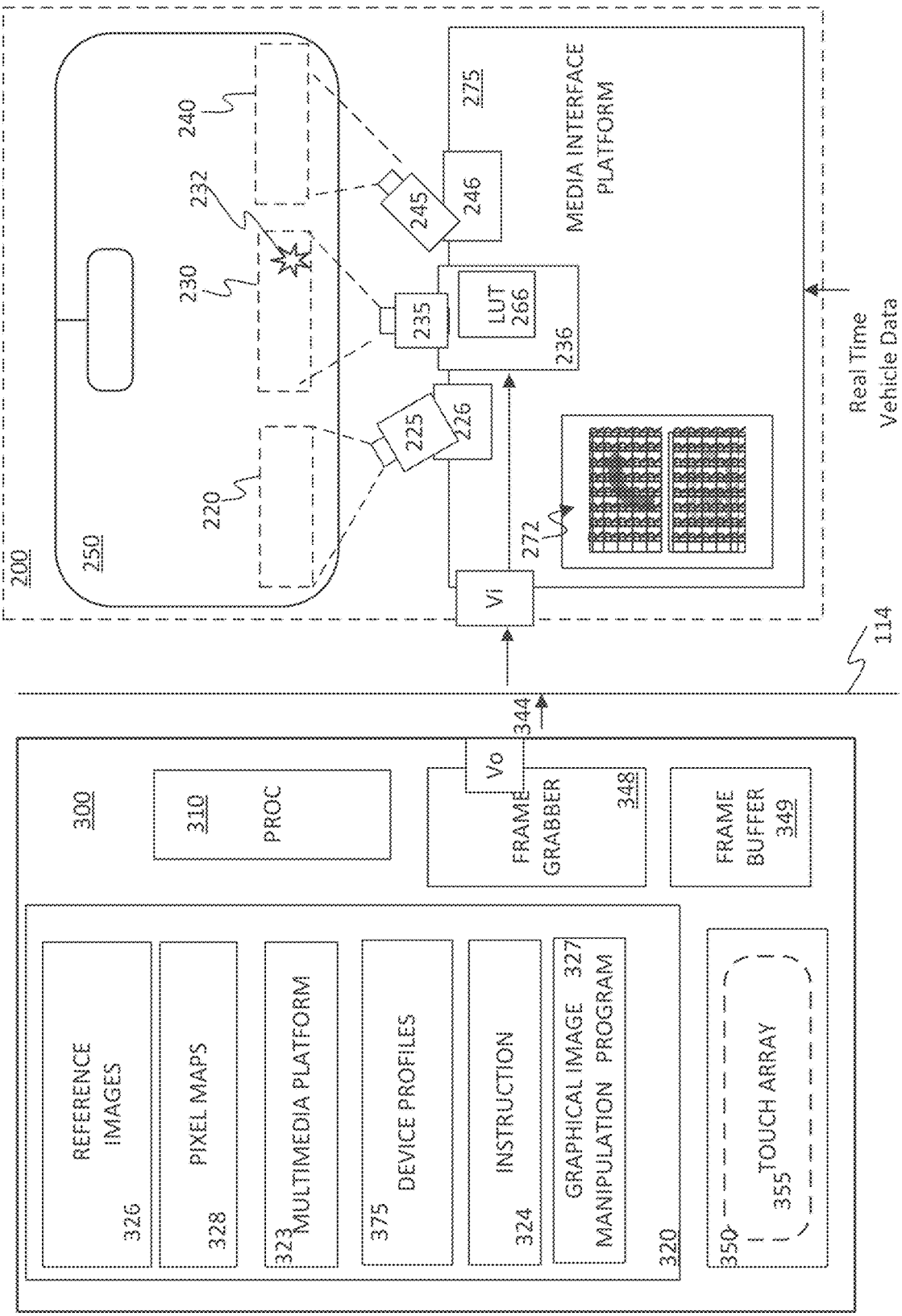
FIG. 4 is a block diagram showing further details of the apparatus of FIGS. 2 and 3.

FIG. 4 is a block diagram showing apparatus 300 shown in FIGS. 2 and 3 and a head up display system 200. Head up display (HUD) system 200 comprises respective projectors 225, 235, 245 and respective corresponding projector controllers 226, 236, 246 disposed within vehicle 102 (illustrated in FIG. 1) and arranged to project HUD optical input images 272 onto corresponding respective transparent projection surfaces comprising transparent displays 220, 230, 240. In the example of FIG. 4, TD 230 has a surface chip or pit 232. A media interface platform 275 can store HUD digital images for producing HUD optical images 272 and may include interfaces to receive other media from sources external to HUD system 200 for projection onto one or more of TD 220, 230, 240.

Apparatus 300 comprises a memory 320, processor 310, display panel 350 (best illustrated in FIG. 3), frame buffer 349 and frame grabber 348 (also shown in FIG. 3). In some implementations, apparatus 300 can comprise a graphics tablet configured with a special purpose touch screen drawing application. An example of a suitable touch screen drawing application is 'Artist Pro 16TP Drawing Display' available from XPPen Technology Co. 15350 Fairfield Ranch Road Unit G1, Chino Hills, CA, 91709 (https://www.xp-pen.com/store/).

Memory 320 can store reference images 326, pixel maps 328 generated by methods 500 and 600 described below, libraries, routines and other components implementing a multimedia platform 323, device profiles 375, processor executable instructions 324 and processor executable instructions comprising a graphics image manipulation program 327. Processor executable instructions 324 configure processor 310 to perform the processes, functions and methods disclosed and described herein.

Graphical image manipulation application 327 comprises processor executable instructions that configure processor 310 to perform image generation and manipulation functions described herein. The image manipulation functions can be provided by any suitable image manipulation program with touchscreen image manipulation capability. Examples of suitable touchscreen image manipulation programs for Linux, Windows and macOS devices include GIMP 2.99 (GNU Image Manipulation Program) which is freely distributed and available from www.gimp.org.

In an example implementation, multimedia platform 323 implements frame grabber 348 as part of a cross-platform multimedia framework such as Fast Forward Moving Picture Experts Group (FFmpeg) platform, available from FFmpeg.org. FFmpeg is published under the GNU Lesser General Public License (LGPL) 2.1 or later, or 2.0 or later depending on which options are enabled.

Figure 5:
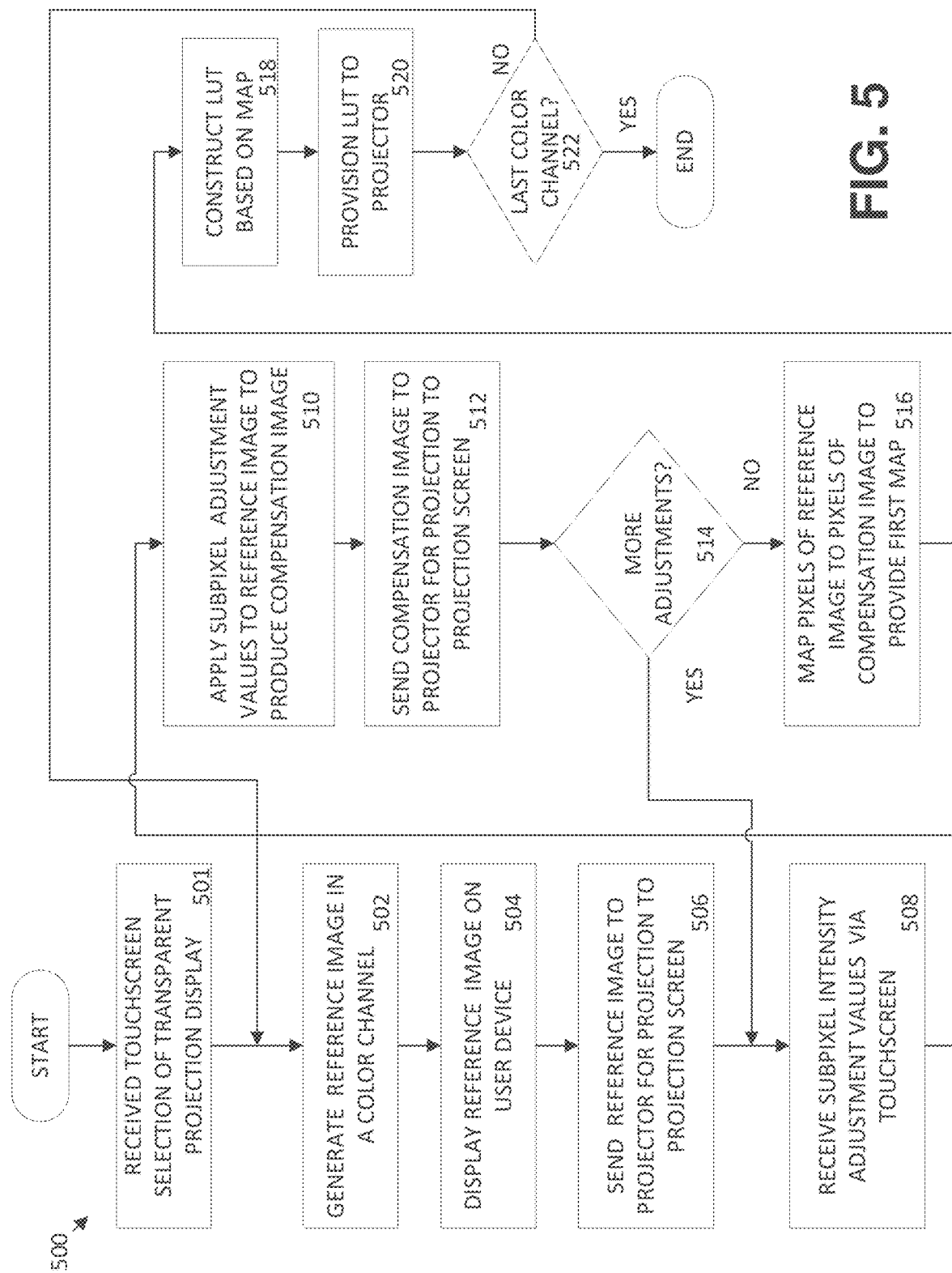
FIG. 5 is a flowchart of a method for photometric projection compensation.

FIG. 5 is a flowchart of a method 500 for photometric projection compensation.

At block 501 processor 310 receives an indication of a user selection of a transparent projection screen for photometric projection compensation.

At block 502 processor 310 generates or acquires a first color channel reference image for the selected transparent projection screen based on a device profile of a projector corresponding to the transparent projection screen.

At block 504 processor 310 displays the reference image on a display panel of the user graphics device.

At block 506 processor 310 sends the reference image to the projector for projection to the projection screen selected at block 501.

At block 508 processor 310 receives subpixel intensity adjustment values for the reference image via a touchscreen of the user graphics device.

At block 510 processor 310 applies the subpixel intensity adjustment values to the reference image to provide a first color channel reference compensated image.

At block 512 processor 310 sends the first color channel reference compensated image to the projector for projection onto the transparent projection screen. When the projector projects the reference compensated image onto the transparent projection screen, user 2 can observe the displayed image including any brightness aberrations in the area of the chip or repair.

At block 514 processor 310 determines whether the user will make more adjustments to the first color channel reference image. If so, processor 310 proceeds to block 508 where processor 310 receives further subpixel intensity adjustments via the touchscreen. Processor 310 repeats blocks 510, 512 and 514 until processor 310 determines no further adjustments are to be made in the first color channel of the reference image.

If no further adjustments are to be made to the first color channel reference image, processor 310 proceeds to block 516. At block 516 processor 310 maps pixel values of the reference image (before adjustment) to pixels of the reference compensated image.

At block 518 processor 310 constructs a look up table (LUT) based on the map provided at block 516.

At block 520 processor 310 provisions the LUT to the projector.

At block 522 processor 310 determines whether a reference compensated image has been provided for each of the three image color channels. If not, processor 310 returns to block 502. At block 502 processor 310 generates another reference image for a second color channel and repeats blocks 508, 510, 512, 514, 516, 518 and 520 until the last of the three color channel LUTs has been provisioned to the projector at block 522 and the method ends.

Figure 6:
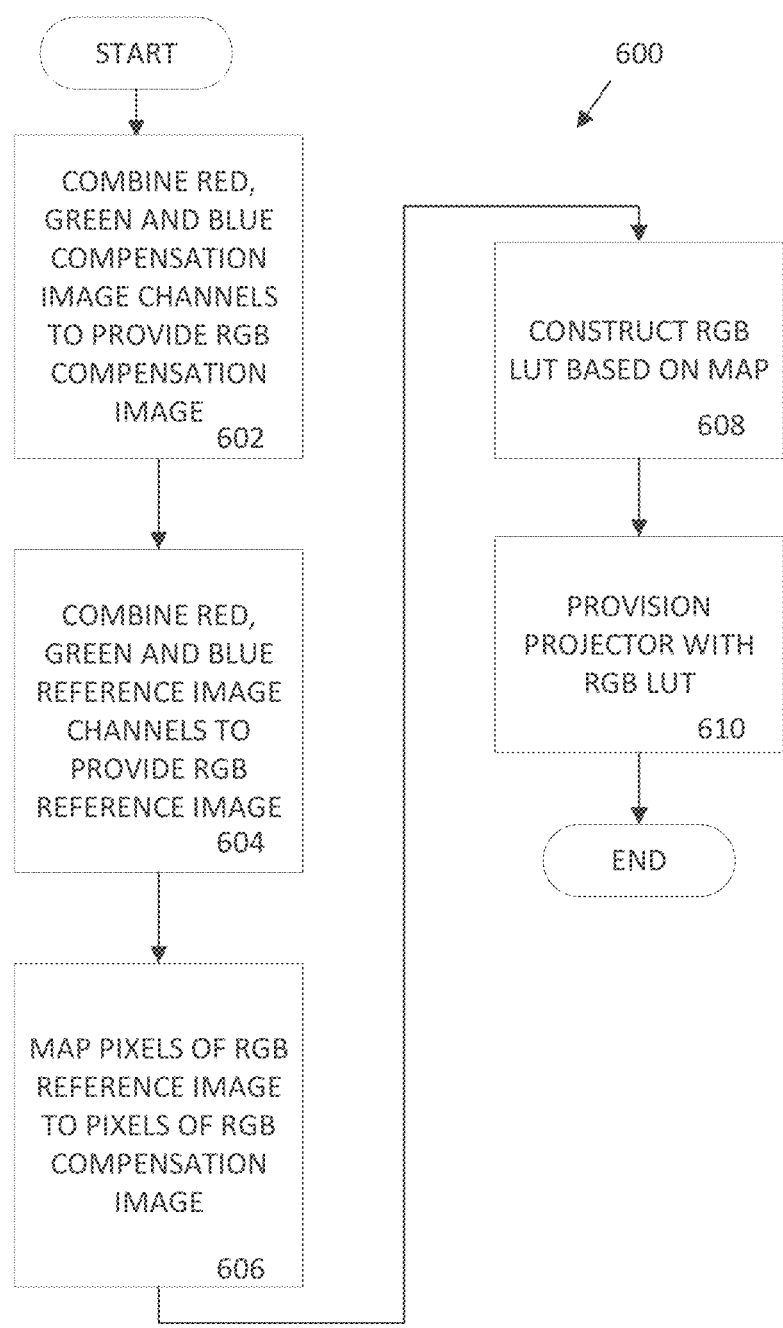
FIG. 6 is a flowchart of a method for photometric projection compensation.

FIG. 6 is a flowchart of a method 600 for providing photometric projection compensation for a projector of a head up display (HUD).

At block 602 processor 310 combines red, green and blue channel reference compensated images generated at block 510 of method 500 shown in the flowchart of FIG. 5 to provide an RGB reference compensated image.

At block 604 processor 310 combines red, green and blue channel reference images generated at block 502 of the method 500 illustrated in the flowchart of FIG. 5 to provide an RGB reference image.

At block 606 processor 310 maps pixel values of the RGB reference image to pixel values of the RGB reference compensated image.

At block 608 processor 310 constructs an RGB LUT based on the map.

At block 610 processor 310 provisions the projection with the RGB LUT and the method ends.

FIG. 7 is a flowchart of a method of performing a preliminary eligibility evaluation to determine if windshield 250 is eligible for repair and/or photometric projection compensation. Some types of windshield damage require replacement of the windshield. For example, some insurance companies, states, or countries mandate windshield replacement if the chip is in the driver's primary field of view (FoV).

At block 702 processor 310 enters photometric projection compensation eligibility mode.

At block 704 processor 310 determines geographic location of vehicle 102. In an example implementation, memory 320 stores graphics representations of reference windshields for a plurality of geographic regions. To determine the geographic region of the vehicle, apparatus 300 can query a vehicle GPS system. Apparatus 300 can retrieve a graphic representation of a reference windshield indicating reference windshield zones in which repairs are permitted, or not permitted based on the determined geographic region.

Figure 9:
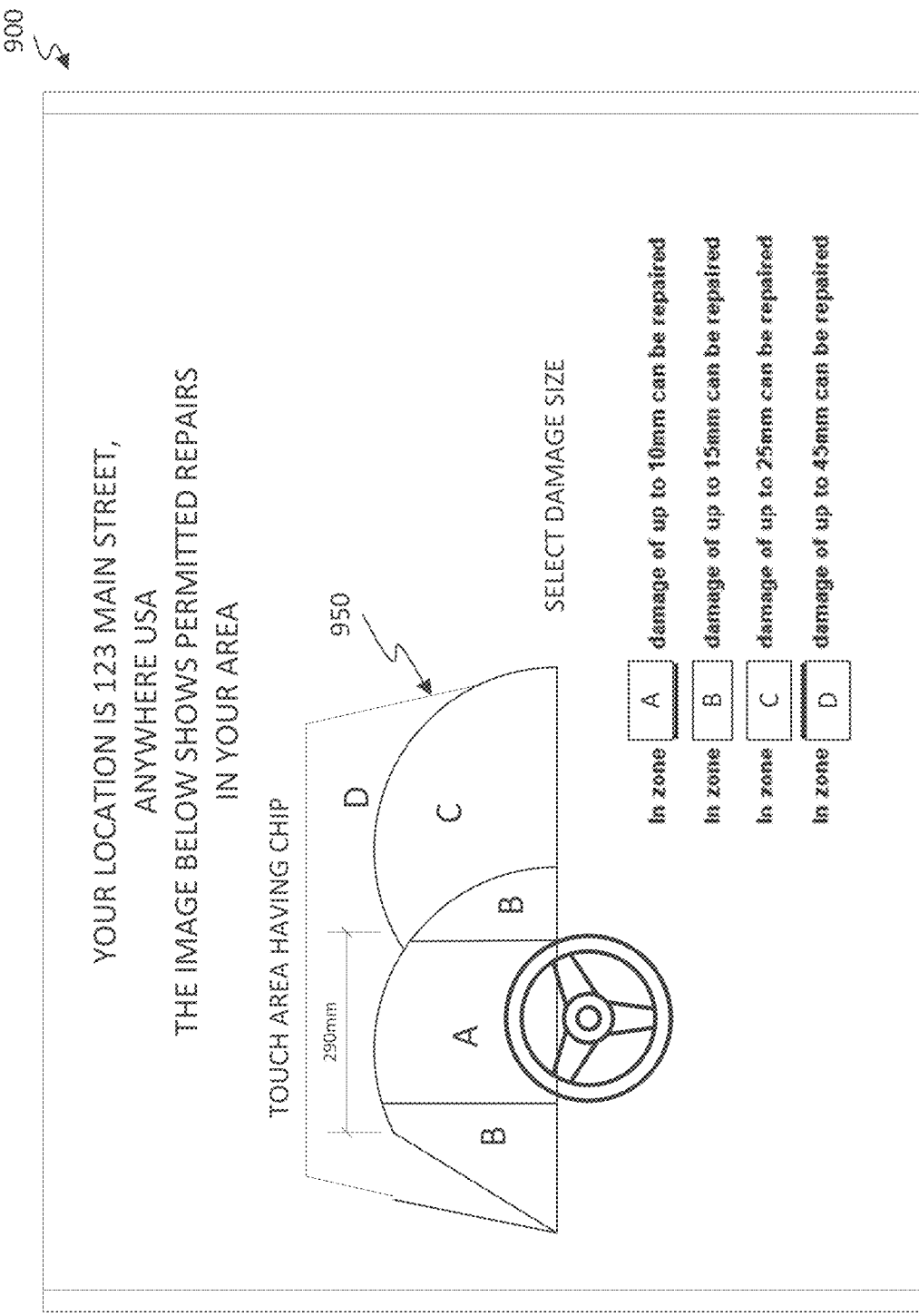
FIG. 9 is an example display screen depicting a windshield repair zone map.

At block 706 processor 310 displays a screen 900 showing the repair zone map 950 (illustrated in FIG. 9) indicating which windshield zones A, B, C, D may be repaired based on the geographic location determined at block 704. Table I shows criteria for repairing a windshield chip according to British Standard Code of Practice BS AU 242 1998. In that case, for example, if the chip is located in windshield zone A, damage of up to 10 mm can be repaired.

TABLE I

| WS ZONE | REPAIR CRITERIA |
| --- | --- |
| A | damage of up to 10 mm can be repaired |
| B | damage of up to 15 mm can be repaired |

TABLE I-continued

| WS ZONE | REPAIR CRITERIA |
|---|---|
| C | damage of up to 25 mm can be repaired |
| D | damage of up to 45 mm can be repaired |

At block 708 processor 310 receives a touch input indicating which of the displayed windshield zones has the chip or repair.

At block 709 processor 310 receives touch input indicating dimension of the damage.

At block 710 processor 310 determines if repair is permitted based on the indicated windshield zone and the dimension of the damage.

If processor 310 determines repair is not permitted, processor 310 proceeds to block 712 and terminates the method.

If processor determines repair is permitted, processor 310 proceeds to block 714. At block 714 processor 310 performs method 800 according to the flowchart shown in FIG. 8.

At block 716 processor 310 determines whether method 800 has completed. If method 800 has not been completed, processor 310 continues to perform the procedure at block 714. If method 800 has completed, processor 310 ends method 700.

FIG. 8 is a flowchart of a method for photometric projection compensation. At block 802 processor 310 displays a graphical image representing windshield 250 on display panel 350. Graphical representation includes graphical objects representing TDs 220, 230 240.

At block 804 processor 310 receives an indication of a user selection of one of TD 220, 230, 240, e.g., TD 230 having a chip 232.

At block 806 processor 310 constructs one or more a photometric projection compensation LUTs 266 (illustrated in FIG. 4) for selected TD 230, e.g., by performing methods 600 or 700.

At block 808, processor 310 provisions the one or more photometric projection compensation LUTs 266 to projector 235 and the method ends.

Once provisioned with a projection compensation LUT 266, a controller 236 of projector 235 can provide projector input images (e.g., images 272 illustrated in FIG. 4) to LUT 266. For the pixels of the input images, LUT 266 can look up corresponding pixel intensity adjustment values in red, green and/or blue image channels to compensate the input images for the variations in surface albedo around chip or treated portion 232, i.e., pixel intensity adjustment values by which pixels of the reference image in the same array position as the pixels in the input images were adjusted to provide the reference compensated images.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other non-transitory storage medium from which a computer can read stored data or instructions.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of singular articles such as "a," "the," "said," etc. should be read to recite one or more of the indicated elements unless a claim recites an explicit limitation to the contrary.

We claim:

1. An apparatus comprising:
  a processor;
  a display panel including a touchscreen;
  a memory storing processor executable instructions that configure the processor to:
    receive via the touchscreen, first pixel intensity adjustment values; and adjust pixels of a reference image in accordance with the first pixel intensity adjustment values to provide a reference compensated image which, when projected by a projector of a head up display (HUD) system onto a transparent projection surface, counters effects of spatially varying albedo of the transparent projection surface on the reference image when the reference image is displayed on the transparent projection surface, wherein the spatially varying albedo is introduced via a physical abnormality in the transparent projection surface due to damage and/or repair.

2. The apparatus of claim 1, wherein the processor is further configured to:
map pixel values of the reference image to pixel values of the reference compensated image to construct a projection compensation look up table (LUT), wherein, for pixels that correspond to an area of the transparent projection surface including the physical abnormality, the pixel values of the reference compensated image differ from the pixel values of the reference image, and, for pixels that correspond to an area of the transparent projection surface lacking the physical abnormality, the pixel values of the reference compensated image match the pixel values of the reference image; and
provision the projector with the projection compensation LUT to compensate, prior to projection onto the transparent projection surface, pixels for input images that correspond to the area of the transparent projection surface including the physical abnormality.

3. The apparatus of claim 1, wherein the transparent projection surface comprises a portion of a vehicle windshield having a chip and the processor is further configured to:
display on the display panel a graphical image of a reference windshield indicating reference windshield zones eligible for repair of the chip;
receive via the touchscreen an indication of a reference windshield zone corresponding to the portion of the vehicle windshield having the chip; and
determine eligibility of the vehicle windshield for photometric projection compensation based on the indication of the reference windshield zone.

4. The apparatus of claim 1, wherein the processor is further configured to, before receiving the first pixel intensity adjustment values:
send the reference image to the projector for projection onto the transparent projection surface; and
display the reference image on the display panel.

5. The apparatus of claim 4, wherein the processor is further configured to:
after receiving the first pixel intensity adjustment values;
displaying the reference compensated image on the display panel; and
sending the reference compensated image to the projector for projection onto the transparent projection surface.

6. The apparatus of claim 5, wherein the processor is further configured to:
receive via the touchscreen, second pixel intensity adjustment values; and
adjust intensity values of pixels of the reference compensated image to provide a modified reference compensated image.

7. The apparatus of claim 1, wherein the processor is further configured to:
generate the reference image in a first color channel;
display the reference image in the first color channel on the display panel; and
provide the reference image in the first color channel to the projector for projection onto the transparent projection surface.

8. The apparatus of claim 7, wherein the processor is further configured to:
receive the first pixel intensity adjustment values as subpixel intensity adjustment values, and
modify subpixels of the reference image in the first color channel in accordance with the subpixel intensity adjustment values to generate the reference compensated image in the first color channel.

9. The apparatus of claim 8, wherein the processor is further configured to:
provide the reference compensated image in the first color channel to the projector for projection onto the transparent projection surface; and
display the reference compensated image in the first color channel on the display panel.

10. The apparatus of claim 9, wherein the processor is further configured to:
map pixel values of the reference image in the first color channel to pixel values of the reference compensated image in the first color channel to provide a mapping;
construct a first color channel LUT based on the mapping; and
provision the first color channel LUT to the projector.

11. A method comprising:
receiving via a touchscreen of a graphics device including a display panel, first pixel intensity adjustment values; and
adjusting pixels of a reference image in accordance with the first pixel intensity adjustment values to provide a reference compensated image which, when projected by a projector of a head up display (HUD) system onto a transparent projection surface, counters effects of spatially varying albedo of the transparent projection surface on the reference image when the reference image is displayed on the transparent projection surface, wherein the spatially varying albedo is introduced via a physical abnormality in the transparent projection surface due to damage and/or repair.

12. The method of claim 11, comprising:
mapping pixel values of the reference image to pixel values of the reference compensated image to construct a projection compensation look up table (LUT), wherein, for pixels that correspond to an area of the transparent projection surface including the physical abnormality, the pixel values of the reference compensated image differ from the pixel values of the reference image, and, for pixels that correspond to an area of the transparent projection surface lacking the physical abnormality, the pixel values of the reference compensated image match the pixel values of the reference image; and
provisioning the projector with the projection compensation LUT to compensate, prior to projection onto the transparent projection surface, pixels for input images that correspond to the area of the transparent projection surface including the physical abnormality.

13. The method of claim 11, wherein the transparent projection surface comprises a portion of a vehicle windshield having a chip and the method comprises:
displaying on the display panel a graphical image of a reference windshield indicating reference windshield zones eligible for repair of the chip;

receiving via the touchscreen an indication of a reference windshield zone corresponding to the portion of the vehicle windshield having the chip; and determining eligibility of the vehicle windshield for photometric projection compensation based on the indication of the reference windshield zone.

14. The method of claim 11, comprising: before receiving the first pixel intensity adjustment values:

sending the reference image to the projector for projection onto the transparent projection surface; and displaying the reference image on the display panel.

15. The method of claim 14, comprising: after receiving the first pixel intensity adjustment values:

displaying the reference compensated image on the display panel; and sending the reference compensated image to the projector for projection onto the transparent projection surface.

16. The method of claim 15, comprising:

receiving via the touchscreen, second pixel intensity adjustment values; and adjusting intensity values of pixels of the reference compensated image to provide a modified reference compensated image.

17. The method of claim 11, comprising:

generating the reference image in a first color channel;

displaying the reference image in the first color channel on the display panel of the graphics device; and providing the reference image in the first color channel to the projector for projection onto the transparent projection surface.

18. The method of claim 17, comprising:

receiving the first pixel intensity adjustment values as subpixel intensity adjustment values, and modifying subpixels of the reference image in the first color channel in accordance with the subpixel intensity adjustment values to generate the reference compensated image in the first color channel.

19. The method of claim 18, comprising:

providing the reference compensated image in the first color channel to the projector for projection onto the transparent projection surface; and displaying the reference compensated image in the first color channel on the display panel of the graphics device.

20. The method of claim 19, comprising:

mapping pixel values of the reference image in the first color channel to pixel values of the reference compensated image in the first color channel to provide a mapping;

constructing a first color channel LUT based on the mapping; and provisioning the first color channel LUT to the projector.

* * * * *